United States Patent [19]

Damadian

[11] 3,789,832
[45] Feb. 5, 1974

[54] APPARATUS AND METHOD FOR DETECTING CANCER IN TISSUE

[76] Inventor: Raymond V. Damadian, 64 Short Hill Rd., Forest Hill, N.Y. 11375

[22] Filed: Mar. 17, 1972

[21] Appl. No.: 235,624

[52] U.S. Cl.................. 128/2 R, 128/2 A, 324/.5 R
[51] Int. Cl................................................ A61b 5/05
[58] Field of Search .... 128/2 R, 2 A, 1.3; 324/.5 A, 324/.5 B

[56] References Cited
UNITED STATES PATENTS
3,691,455  9/1972  Moisio et al. ................. 324/.5 R
3,557,777  1/1971  Cohen ............................. 128/2 R
3,530,371  9/1970  Nelson et al. ................ 324/.5 AC OTHER PUBLICATIONS
Singer, J. R., Journ. of Applied Physics, Vol. 31, No. 1, Jan., 1960, pp. 125–127,

*Primary Examiner*—Kyle L. Howell
*Attorney, Agent, or Firm*—Brumbaugh, Graves, Donohue & Raymond

[57] ABSTRACT

An apparatus and method in which a tissue sample is positioned in a nuclear induction apparatus whereby selected nuclei are energized from their equilibrium states to higher energy states through nuclear magnetic resonance. By measuring the spin-lattice relaxation time and the spin-spin relaxation time as the energized nuclei return to their equilibrium states, and then comparing these relaxation times with their respective values for known normal and malignant tissue, an indication of the presence and degree of malignancy of cancerous tissue can be obtained.

16 Claims, 3 Drawing Figures

APPARATUS AND METHOD FOR DETECTING CANCER IN TISSUE

BACKGROUND OF THE INVENTION

This invention relates to an apparatus and method of detecting cancer in tissue and, more particularly, to the use of nuclear magnetic resonance techniques to detect alterations in the organization and structure of selected nuclei in the tissue which alterations are believed to be caused by cancer.

At present, early detection of internal cncerous tumors is hampered by the relatively high permeability of the many tumors to X-rays. Detection in these cases depends mainly on the indirect evidence provided by the displacement of normal radiopaque structures pushed aside by the tumor. Therefore, the present methods are directed to a qualitative analysis only and lack a quantitized aspect such that a firm basis for decision does not exist as to whether cancer is present and if so how malignant it is.

SUMMARY OF THE INVENTION

It is an object of this invention to provide apparatus and a method for the quantitative detection of cancer in tissue and in particular to provide apparatus for use by clinical and diagnostic laboratories and in the operating room for rapid screening of cancer in small samples of surgically removed tissue.

Furthermore, it is an object of this invention to provide criteria for determining the degree of malignancy of the cancerous tissue detected.

It is a further object of this invention to provide apparatus and method for the detection of cancer in humans which does not require tissue to be surgically removed and can be done with the probes entirely external to the body of the human who is being examined.

These and other objects are attained, in accordance with the invention, by measuring the degree of organization of selected nuclei in the tissue being analyzed.

It has now been found that certain molecules in cancerous cells are more disorganized and arranged with less structure than the same molecules in normal cells. It is known, for example, that the water molecules present in normal cells exist in multiple polarized layers absorbed onto cell protein chains. In cancerous tissue, however, the structure is broken down and the water molecules become disassociated from the protein chains, the result being that water molecules in cancerous tissue are not as compacted as they are in normal tissue.

It has now been found that, by measuring the degree of organization of these selected molecules in cells being studied and comparing this with the degree of organization in a known cancerous cell, cancer cells can be detected. Furthermore, it has now been found that the less the organization the greater the malignancy, therefore, a scale can be made to provide a standard for basing a decision on the degree of malignancy.

The present invention utilizes nuclear magnetic resonance (NMR) techniques to determine this degree of organization. Essentially, the tissue to be analyzed is placed in a tissue holder located in a nuclear induction apparatus and positioned to be exposed to two magnetic fields provided by two sources located in the induction apparatus. One source is an electromagnet in the preferred embodiment and provides a static magnetic field of known strength. The other source provides an oscillating magnetic field and is positioned so that the direction of its radiated field is orthogonal to the field provided by the electromagnet. The frequency of the oscillating magnetic field is adjusted to casue selected nuclei in the cells to be energized from their equilibrium states to higher energy states through NMR absorption. After a predetermined length of time, the oscillating source is turned off and measurements are made of the spin-lattice relaxation time and spin-spin relaxation time for the energized nuclei returning to their equilibrium states.

It is known that for any given nuclei, the relaxation times increase in proportion to the degree of motional freedom between the nuclei. For example, the relaxation times for hydrogen nuclei in distilled water is several orders of magnitude greater than the corresponding relaxation times for the hydrogen nuclei in ice.

In the present invention, the measurement of relaxation times for selected nuclei in the tissue cells being examined provide a way of measuring the degree of disorganization of the selected nuclei in these cells. By comparing the relaxation times for this tissue with relaxation times obtained for known normal tissue and known cancerous tissue, it can be determined whether cancer is present and if so the degree of malignancy.

In a second embodiment, apparatus is described which can be used to detect cancer in mammallian tissue and in particular humans without having to remove surgically a sample of the tissue to be analyzed. In this embodiment, the entire mammal or human being is placed in a magnetic field provided by an electromagnet sufficiently large to surround the mammal or human. The second magnetic field is directed to a unit which focuses the oscillating magnetic field radiation into a beam. Further apparatus is provided for scanning throughout the entire body during which time the relaxation times are measured for selected nuclei and compared with standards. In this way a determination can be made of the existence of cancer together with the location and degree of malignancy of the cancerous cells present.

For a better understanding of the invention, reference may be made to the following detailed description of the representative embodiments, taken in conjunction with the figures of the accompanying drawings in which.

DESCRIPTION OF A PREFERRED EMBODIMENT

Figure 1:
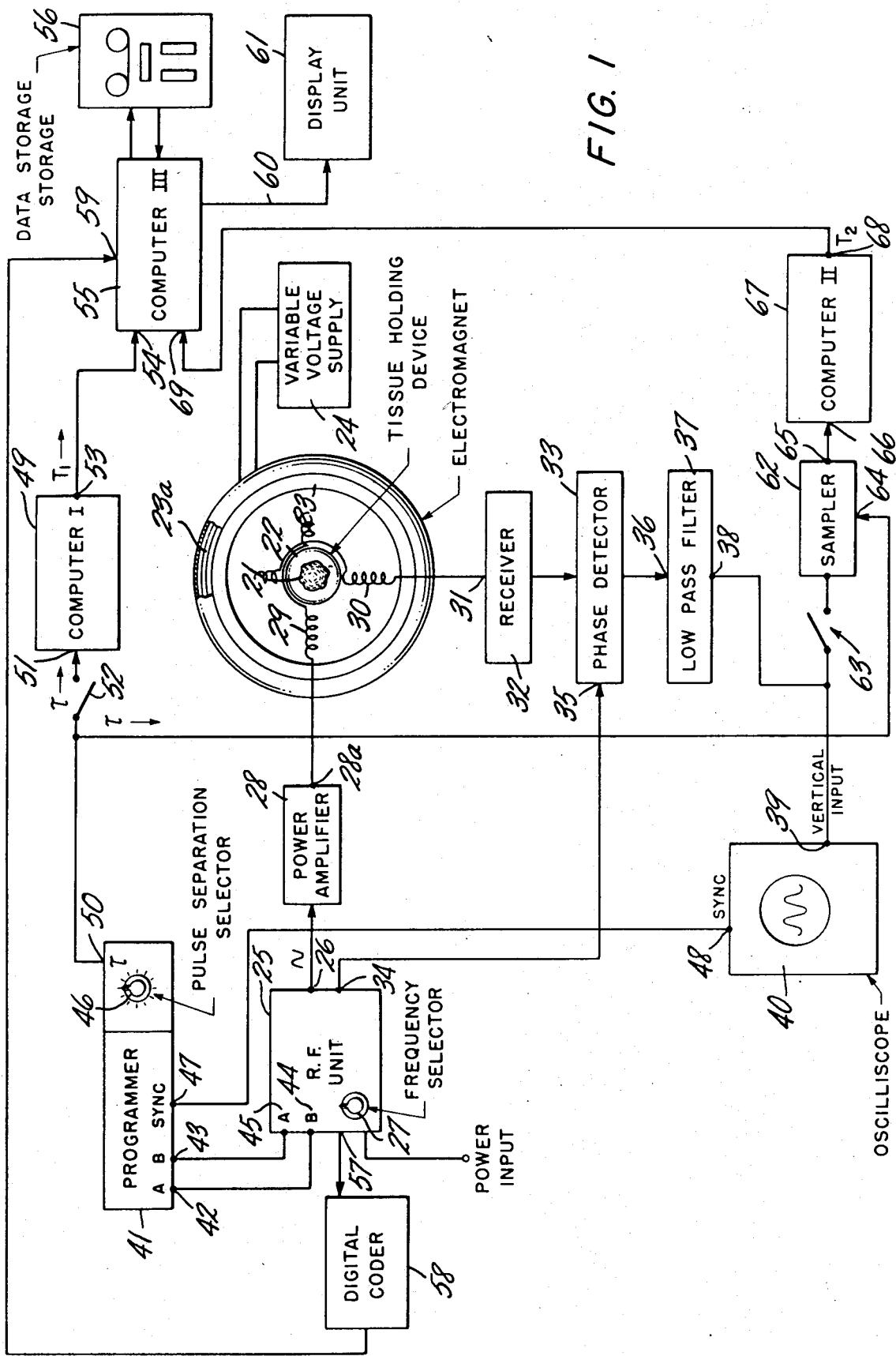
FIG. 1 is a schematic diagram of suitable apparatus for detecting cancerous tissue in accordance with the invention.

In the embodiment illustrated in FIG. 1, apparatus is shown for measuring the spin-lattice relaxation time and spin-spin relaxation time of a tissue sample 21 held by tissue holding means 22.

An electromagnet 23, having a wire coil 23a energized by a variable voltage supply 24, provides the necessary magnetic field for causing selected nuclei, generally protons, in the tissue sample 21 to separate into discrete energy levels. This separation is commonly known as nuclear Zeeman splitting.

Now if a second field is applied to the tissue sample in a direction orthogonal to the first with a frequency determined by inherent characteristics of the selected nuclei and the strength of the field provided by the electromagnet 23, the selected nuclei can be energized from their equilibrium states to higher energy states through nuclear magnetic resonance (NMR) absorption.

In the present invention this second magnetic field is generated by a radio-frequency oscillator 25 which provides a signal at its output terminal 26 having a frequency which can be adjusted manually by frequency selector 27.

The signal on output terminal 26 is directed to a power amplifier 28 whereby the amplitude of the signal generated by the oscillator 25 is increased. The amplified signal appearing at the output terminal 28a is then directed to a coil transmitter probe 29 which radiates magnetic energy into the magnetic field space formed by the electromagnet 23. The orientation of the transmitter probe 29, in the preferred embodiment, is adjusted to be orthogonal to the direction of the field formed by electromagnet 23.

In order to determine the spin-lattice relaxation time and the spin-spin relaxation time of the selected nuclei returning to their equilibrium states from the higher energy states, a coil receiver probe 30 is provided for detecting signals generated by the decaying nuclei. This probe is positioned essentially at right angles with the transmitter probe 29 and also the direction of the field provided by the electromagnet 23.

The signals detected by the receiver probe 30 are directed to the input terminal 31 of the receiver amplifier 32. The output of the receiver amplifier 32 is directed to a phase detector 33 which is commonly used in NMR applications to determine when the frequency of the radio frequency source 25 has been properly adjusted to supply the conditions necessary for NMR absorption. A signal having the frequency of the radio frequency source 25 is supplied to the output terminal 34 of unit 25 and then supplied to the input terminal 25 of the phase detector 33.

The signal output of the phase detector 33 is in turn directed to the input terminal 36 of a low pass filter 37. This filter filters out the resonance frequencies and allows the envelope responsive to the amplitude of the signal detected by the receiver probe 30 to appear at output terminal 38.

The signal appearing at 38 is directed to the vertical input 39 of oscilloscope 40 so that the signal can be displayed visually.

In the experiments described below, a programmer 41 (See FIG. 1) was used to provide a sequence of pulses necessary in NMR applications. By way of example, a Nuclear Magnetic Resonance Specialties, Model P-102A Pulse Programmer, can be used. This Programmer is part of the Nuclear Magnetic Resonance Specialties, PS-60A NMR Spectrometer.

In programmer 41, an A pulse output terminal 42 and a B pulse output terminal 43 are provided and they are connected with their respective input terminals 44 and 45 of radio frequency generator 25. Under operator control the programmer 41 through circuitry not shown signals the radio frequency generator 25 to produce pulse sequences necessary in measuring spin-lattice and spin-spin relaxation times. These pulse sequences corresponding to the Carr-Purcell sequences will be described in more detail below. The separation time between pulses is controlled manually by the pulse separation selector 46. The programmer 41 also provides a sync signal appearing on output terminal 47 which is directed to input terminal 48 of the oscilloscope 40 for synchronizing the oscilloscope with the pulse sequences.

Example I

Several experiments were performed using Sprague-Dawley rats. Five of the rats were normal, five had previously been infected with Walker sarcoma, three had been infected with Novikoff hepatoma and two of the rats had Fibroadenoma (benign tumors). The rats ranged in weight from 150 to 500 grams and were selected at random to exclude variations in the age of the rat as a material consideration.

The animals were killed by cervical fracture. The infected rats were killed when tumor size reached approximately 1.5 ml in volume. This was 4 to 5 days after inoculation in the case of animals with Novikoff hepatoma and 10 days after inoculation in the case of animals with Walker sarcoma. The samples were excised and packaged in cellulose nitrate tubes. In all cases, NMR measurements were obtained within 5 minutes after the death of the animal.

NMR measurements were taken with an apparatus comprising a Varian electromagnet, 12 inches in diameter operating at approximately 5,610 gauss, a pulse spectrometer model PS-60 AW, made by Nuclear Magnetic Resonance Specialties Corporation, together with a probe of cross-coil design operation at 24 Mhz.

Two types of NMR measurements were taken for each tissue sample. The first measurement was the so-called spin-lattice relaxation time ($T_1$) and this was measured by the method of Carr and Purcell, *Phys. Rev.* 94, 630 (1954). In accordance with this method, a sequence of two pulses is used with pulse widths for the two pulses set to produce a 180° nutation followed by a 90° nutation.

With this sequence, one observes a free induction decay after the second pulse whose amplitude is given by $$M(\tau) = M_o(1 - 2e^{-\tau/T_1})$$

where $M_o$ is the equilibrium value of the pulse amplitude and $\tau$ is the interval between pulses. This equation implies that, if $T_1$ is multiplied by the natural logarithm of 2, the product is equal to the pulse interval that produces no free induction decay after the 90° pulse. In actual practice, once the two pulses were phased and pulse widths set for the proper nutation angle, an oscilloscope 40, Fairchild 766 H/F, 25 and 50 Mhz, was synchronized to trigger on the second pulse and the pulse interval was adjusted until the null free induction decay was obtained. The interval between the two pulses was obtained from a frequency counter, Computer Measurement Company 200 CN, interfaced with the output of the PS-60 spectrometer programmer 41.

The second NMR measurement taken was the so-called spin-spin relaxation time. This was accomplished by using a 90° to 180° pulse sequence, making use of the Carr-Purcell modification identified in the reference noted above to obtain the echo decay envelope.

This method for measuring $T_2$ is free of diffusion effects and field inhomogeneities. Since the envelope height E is given by $$E(2n\tau) = e^{-2n\tau/T_2}$$

where $n$ represents integral multiples of the pulse separation $\tau$, $T_2$ was estimated from the oscilloscope trace as the time required for the envelope height to decay to $1/e$.

Five normal rats were sacrificed, and various types of normal tissue were subject to NMR measurements. The results of these tests are summarized in Table 1 below.

TABLE 1
Spin-lattice ($T_1$) and spin-spin ($T_2$) relaxation times (in seconds) of normal tissues

| Rat No. | Weight (g.) | Rectus muscle | | Liver | | Stomach $T_1$ | Small intestine $T_1$ | Kidney $T_1$ | Brain $T_1$ |
|---|---|---|---|---|---|---|---|---|---|
| | | $T_1$ | $T_2$ | $T_1$ | $T_2$ | | | | |
| 1 | 156 | 0.493 | 0.050 | 0.286 | 0.050 | 0.272 | 0.280 | 0.444 | 0.573 |
| 2 | 150 | .548 | .050 | .322 | .060 | .214 | .225 | .503 | .573 |
| 3 | 495 | .541 | .050 | .241 | .050 | .260 | .316 | .423 | .596 |
| 4 | 233 | .576(*0.600) | .070 | .306(*0.287) | .048 | .247(*0.159) | .316(*0.280) | .541(*0.530) | .620(*0.614) |
| 5 | 255 | .531 | | .300 | | .360 | .150 | .489 | .612 |
| Mean and standard error | | 0.538±0.015 | 0.055±0.005 | 0.293±0.010 | 0.052±0.003 | 0.270±0.016 | 0.257±0.030 | 0.480±0.026 | 0.595±0.007 |

*Spin-lattice relaxation time after the specimen stood overnight at room temperature.

In addition, tumor tissue from a number of infected rats was subjected to NMR measurements and the results of these tests are given in Table 2. As a standard comparison the NMR $T_1$ values for distilled water are also given.

TABLE 2

Spin-lattice ($T_1$) and spin-spin ($T_2$) relaxation times (in seconds) in tumors

| Rat No. | Weight (g) | $T_1$ | $T_2$ |
|---|---|---|---|
| | | Walker sarcoma | |
| 6 | 156 | 0.700 | 0.100 |
| 7 | 150 | .750 | 0.100 |
| 8 | 495 | .794(0.794)* | 0.100 |
| 9 | 233 | .688 | |
| 10 | 255 | .750 | |
| | Mean and S.E. | 0.736±0.022 | 0.100 |
| | P | <.01+ | |
| | | Novikoff hepatoma | |
| 11 | 155 | 0.798 | 0.120 |
| 12 | 160 | 0.852 | 0.120 |
| 13 | 231 | 0.827 | 0.115 |
| | Mean and S.E. | 0.826±0.013 | 0.118±0.002 |
| | P | <.01+ | |
| | | Fibroadenoma (benign) | |
| 14 | | 0.448 | |
| 15 | | .537 | |
| | Mean | .492 | |
| | | Distilled water | |
| | | 2.691 | |
| | | 2.690 | |
| | | 2.640 | |
| | Mean and S.E. | 2.677±0.021 | |

*Spin-lattice relaxation time after the specimen stood overnight at room temperature.
+The P values are the probability estimates of the significance of the difference in the means of $T_1$ for the malignant tumor and for brain.

The contrast between the relaxation rates of malignant Novikoff hepatoma and normal liver illustrates the degree of perturbation of endosolvent structure that can accompany malignant transformation. The considerable increase in relaxation times for the hepatoma ($T_1$, 0.826 second; $T_2$, 0.118 second) relative to normal liver ($T_1$, 0.293 second; $T_2$, 0.050 second) suggests a significant decrease in the degree of ordering of intracellular water in malignant tissue. In addition, it is apparent from the prolonged relaxation times of the two malignant tumors reported in Table 2 that NMR values make it possible to one to detect the presence of metastatic infiltrates of the liver from either Walker sarcoma or Novikoff hepatoma.

The differences between the relaxation rates of malignant tumors and normal liver may be used to distinguish the two malignancies from all of the normal tissues studied [P values less than 0.01 (Table 2)]. The values of $T_1$ in Walker sarcoma (0.736 second) and Novikoff hepatoma (0.826 second) were significantly greater than the values of $T_1$ in any of the normal tissues (0.293 to 0.595 second). The values of $T_2$ in the malignant tumors (0.100 and 0.118 second) were about twice the values of $T_2$ in rectus muscle (0.055 second) and liver (0.052 second). Furthermore, replicate measurements of $T_1$ in the malignant tissues were found to be highly reproducible (standard error of the mean, <0.02) and the normal tissues had a standard error of the mean of 0.03 or less despite deliberate scrambling of the ages and weights of the animals in the experimental colony.

The measurements were also unaffected by any change in the elevation of the sample position in the probe, packing and repacking of the specimen, or the stepwise rotation of the sample tube in the probe through 360°. In fact $T_1$ proved to be even relatively unchanged after the specimens stood overnight at room temperature (Tables 1 and 2, parenthetical values for rats 4 and 8).

The above experiments were conducted without the aid of equipment which could automatically compute $T_1$ and $T_2$ and automatically compare these values with their respective standards for the detection of cancerous tissue. However, a computer 49 could be provided to calculate $T_1 = \tau\text{null}/\ln 2$ where $\tau$ is the time interval between the 180° pulse and the 90° pulse in the Carr-Purcell method described above that produces no free induction decay after the 90° pulse. This value of $\tau$null is the value $\tau$ selected manually on the pulse separation selector 46 to produce the above condition. An electrical signal responsive to the setting of $\tau$ on selector 46 is provided by the programmer 41 and appears at output terminal 50. The signal is directed to an input terminal 51 of computer 49 through a switch 52 which is closed when it is desired to compute and compare values of $T_1$ with a standard.

The value of $T_1$ appearing as a signal at an output 53 of computer 49 is directed to an input terminal 54 of a computer 55. This computer compares the value of $T_1$ at input terminal 54 with a table of standard values for non-cancerous and cancerous tissues stored on a data storage unit 56. This comparison provides an indication whether cancer is present and if so its degree of malignancy. The comparison is made for the particular nuclei selected, each type of nuclei having a separate table of standards. For a given field strength provided by electromagnet 23 the frequency of the radio frequency generator 25 determines which nuclei are selected. Thus, the selected nuclei are known from the setting of the frequency selector 27. An electrical signal responsive to the setting of the frequency selector 27 appears at output terminal 57 of the radio frequency generator 25. This signal is converted into a digital code by a digital coder 58 and supplied to an input terminal 59 of computer 55.

After comparing the values of $T_1$ for the sample 21 with the standards on a data storage unit 56, the computer 55 supplies a signal via line 60 to a display unit 61. This signal is converted by display unit 61 into a visual signal indicating whether cancer is present in tissue sample 21 and if so the degree of malignancy.

Figure 3:
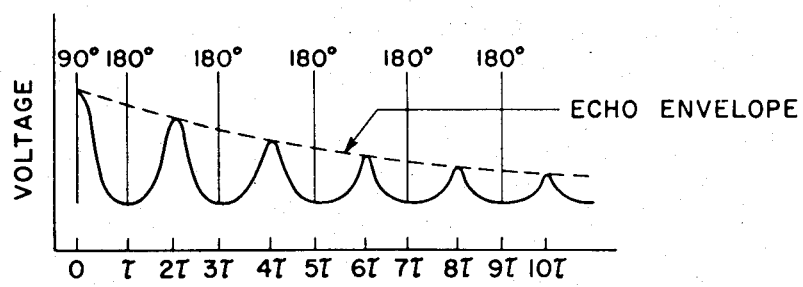
FIG. 3 is a diagram showing the signal output of the low pass filter used in the determination of the spin-spin relaxation time.

For automatically calculating values of $T_2$ for comparing with a standard, a sampler 62 is provided for sampling the signal appearing at terminal 38 of the low pass filter when the switch 63 is closed. The sampler 62 samples the signal at terminal 38 at times $0, 2\tau, 4\tau, 6\tau$, etc., where $\tau$ is again the time interval between the 180° pulse and the 90° pulse generated by the programmer 41 for determining $T_2$. A signal responsive to the $\tau$ selected on selector 46 appears at output terminal 50 of programmer 41 and is supplied to input terminal 64 of sampler 62. To better understand the technique used to determine $T_2$, reference is made to FIG. 3 wherein a plot of the signal appearing at terminal 38 is shown. This plot shows the signal when the programmer 41 has been set to supply a 90° pulse and a train of 180° pulses pursuant to the Carr-Purcell method of measuring $T_2$. The 90° pulse is applied at time 0, and a 180° pulse is applied at times $\tau, 3\tau, 5\tau, 7\tau$, etc. The sampler 62 samples the signal at times $0, 2\tau, 4\tau, 6\tau$, etc., thus obtaining values of the signal which lie on the echo envelope.

The sampled values detected by sampler 62 appear on an output terminal 65 of sampler 62 and are directed to an input terminal 66 of computer 67. The sampled values appearing on input terminal 66 are stored on a real time basis in the computer 67 as is well known in the art.

A computer program could be designed according to the art to label the stored sampled values giving them the labels $V(0), V(1), V(2) \ldots V(I)$ where I is one less than the total number of samples stored (one less because the count started with zero). The computer could then be programmed to compute $T_2$ by performing the following steps:

START
READ V(0)
COMPUTE A = 1/e V(0)
N = 1
2
READ V(N)
IF V(N) < A GO TO 3
N = N + 1
GO TO 2
3
$T_2$ = V(N)
END

In this manner an approximate value of $T_2$ can be computed. Further refinements can be made by determining the best curve connecting the sampled values V(0), V(1), V(2), etc. and then determining the point at which the curve intersects the Y value of 1/e V(0) as is well known in the art. The program set forth above is only an example of a method for determining approximate values of $T_2$.

The output of computer 67 is $T_2$ and appears on output terminal 68. This signal is directed to input terminal 69 of computer 55 where it is compared with a table of standards for the selected nuclei stored on data storage unit 56 in the same manner as $T_1$ is compared with its respective standards. Again the computer 55 supplies a signal via line 60 to the display unit 61 where the signal is converted into a visual signal indicating whether cancer is present in tissue sample 21 and if so the degree of malignancy.

Figure 2:
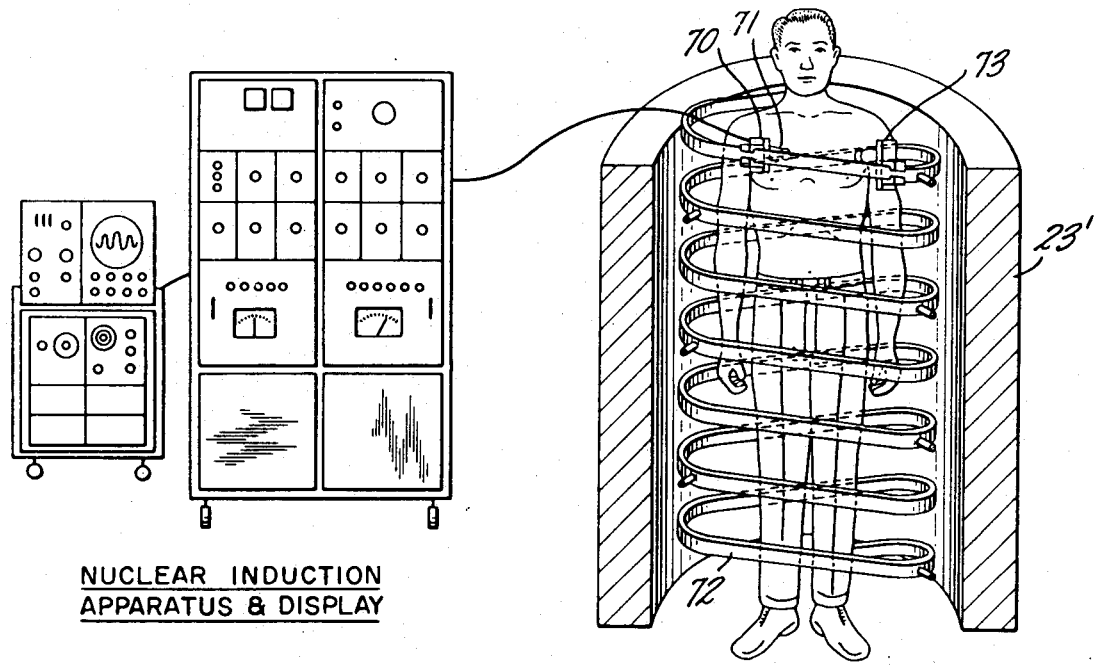
FIG. 2 is a diagram of a particular application of this invention to the detection of cancer in humans.

In another embodiment of this invention illustrated in FIG. 2, apparatus is shown for detecting cancerous cells in mammals and particularly human beings.

The only modification of the apparatus in FIG. 2 with the apparatus shown in FIG. 1 is the design of the electromagnet 23, the tissue holder 22 and the transmitter and receiver probes 29 and 30.

In FIG. 2 an electromagnet 23' shown in cross-section is designed to have sufficiently large dimensions to hold a mammal or human being to be examined. A transmitter probe 70 is provided with a beam focusing mechanism 71 for focusing the radiated magnetic energy from the radio frequency generator 25 into a beam having a narrow cross-section. This probe is slidably mounted on a helical track 72 and positioned so that the radiated beam is orthogonal to the direction of the field provided by electromagnet 23. The transmitter probe 70 is moved on the track 72 by means not shown so that the probe 70 may scan the entire body to be examined. Also mounted on track 72 is a receiver probe 73 of the same design as transmitter probe 70 which detects a beam having the same cross-sectional width as the beam radiated by probe 70. The probe 73 is positioned to detect only beams which are orthogonal to both the direction of the field provided by electromagnet 23' and the direction of the beam radiated by probe 70. As the probe 70 scans the body being examined, the probe 73 moves correspondingly by means not shown to maintain the orthogonal relationship during the scanning process.

In a preferred embodiment the electromagnet 23' is cylindrically shaped so that the field generated has a maximum along the axis of the electromagnet 23' and the transmitter probe 70 is focused to direct its radiated beam to intersect this axis. Further, the receiver probe 73 is focused to receive a beam emanating from the region of impingement of the transmitted beam with the axis of electromagnet 23'.

Since for a given field strength a particular frequency is required for NMR absorption of selected nuclei and since the maximum field strength of the field generated by electromagnet 23' lies along its axis which is uniquely defined for the cylindrical space encompassed by the electromagnet 23', it is possible to select a frequency determined by the maximum field strength provided by electromagnet 23' and the nuclei selected so that a small area defined by the impingement of the beam radiated by transmitter probe 70 and the axis of the electromagnet 23' can be examined. By moving probes 70 and 73 move along the track 72 the entire area of the body lying on the axis of the electromagnet 23' is examined. By repositioning the body with respect to the axis of the electromagnet 23' and rescanning the axis, the entire body can be examined.

The apparatus and method described above has many desirable features including the ability to detect internal cancer with an external probe. Thus by using this apparatus and method it is unnecessary to surgically remove a tissue sample for examination.

In determining relaxation times for tissue cells within the body being examined, it is necessary to have quite high magnetic field strengths to penetrate the body. There have been some recent studies by NASA on the effect of high strength magnetic fields on humans. A study of their conclusions indicates that the strength of the magnetic fields contemplated here would not be deleterious to the tissue under examination.

Since NMR analysis is directed to the atomic level, the operator of this system has available for study a wide range of nuclei in determining deviant chemical behavior. In the experiments noted above the hydrogen nuclei of water were selected for studying the organization of water molecules in tissue cells. It can be appreciated that there may be other nuclei which may be subjected to NMR analysis for cancer detection. For example, it is generally known that the cancerous change is uniformly associated with derangements in the cells chromosomes. Since DNA is the main constituent of chromosomes and further since phosphorus is a main element in the polymer backbone of DNA, chromosome derangements are reflected in the chemistry of the phosphorus nucleus and hence, in the NMR spectra of cellular phosphorus.

From the foregoing it will be seen that the present invention provides a much needed method and apparatus for detecting the presence of cancer and providing a quantitative analysis of the malignancy of any cancer cells detected. It will be understood that many modifications of the structure of the preferred embodiments will occur to those skilled in the art, and it is understood that this invention is to be limited only by the scope of the following claims.

I claim:
1. A method for detecting cancer comprising:
   a. measuring and establishing standard NMR spin-lattice relaxation times and spin-spin relaxation times for both normal and cancerous tissue of the type under analysis using as an indicator nuclei at least one nuclei which exhibits deviant behavior in cancerous tissue;
   b. measuring the NMR spin-lattice relaxation times and spin-spin relaxation times for the suspected tissue to determine the extent of deviant behavior of the indicator nuclei; and
   c. comparing the values obtained in (b) against the standards obtained in (a).

2. The method of claim 1, wherein the indicator nuclei are cell water protons.

3. A method for distinguishing cancerous tissue from normal, healthy tissue which comprises:
   a. positioning a tissue sample in a nuclear induction apparatus having two sources of magnetic energy;
   b. actuating the first source to expose the sample to a magnetic field;
   c. actuating the second source to expose the sample to oscillating magnetic radiation having a frequency selected to permit the absorption by selected nuclei of energy from the oscillating field through nuclear magnetic resonance absorption, thereby inducing transistors between equilibrium states and higher energy states;
   d. terminating the radiation from the second source after a predetermined duration;
   e. measuring the spin-lattice relaxation time and spin-spin relaxation time as the energized nuclei return to their equilibrium states; and
   f. comparing the relaxation times with respective predetermined standards for normal and cancerous tissue, said comparisons indicating the presence and degree of malignancy of cancerous tissue.

4. The method according to claim 3, wherein the first source of magnetic energy is actuated to provide a static magnetic field orthogonal to the second magnetic field.

5. A method according to claim 4, wherein the selected nuclei comprise water protons.

6. A method according to claim 2, wherein the selected nuclei are phosphorus.

7. A method of detecting cancerous mammalian tissue comprising:
   a. providing a magnetic field space having a locus therein of equal field strength;
   b. positioning a mammal within said space;
   c. directing a beam of magnetic radiation having a predetermined frequency to impinge on said locus in a direction orthogonal to the direction of the magnetic field, the frequency being selected to permit absorption by selected nuclei in the region of impingement of energy from the beam through nuclear magnetic resonance absorption, thereby inducing transitions in the selected nuclei between equilibrium states and higher energy states;
   d. terminating the beam after a predetermined duration;
   e. measuring the spin-lattice relaxation time and the spin-spin relaxation time values as the energized nuclei return to their equilibrium states; and
   f. comparing the values obtained in (e) with predetermined like values for normal and for cancerous tissue, said comparison indicating the existence and degree of malignancy.

8. A method according to claim 7 further comprising scanning the beam of magnetic radiation across the locus.

9. A method according to claim 8, wherein the magnetic field is formed within a hollow, cylindrical superconducting solenoid, and the locus comprises the axis of the superconducting solenoid along which axis the field strength is a maximum.

10. A method according to claim 7, wherein the selected nuclei comprise water protons.

11. The method of claim 7, wherein the selected nuclei is phosphorus.

12. Apparatus for determining whether a tissue sample is cancerous comprising:
   a. nuclear induction apparatus including a magnetic field source means for forming a magnetic field space of a predetermined field strength and an oscillator source means for selectively supplying oscillating magnetic energy to the magnetic field space together with means for adjusting the frequency of the oscillator to satisfy nuclear magnetic resonance conditions for selected nuclei in the tissue sample;
   b. a tissue holding means for holding the tissue sample in the magnetic field space;
   c. means for determining the spin-lattice relaxation time of the selected nuclei in the tissue sample;

d. means for determining the spin-spin relaxation time of the selected nuclei in the tissue sample;
e. means for storing reference tables comprising the standard spin-lattice relaxation times and spin-spin relaxation times for the selected nuclei;
f. means for comparing the spin-lattice relaxation time and the spin-spin relaxation time of the selected nuclei in the tissue sample with the respective standards for normal tissue for the selected nuclei, and means for indicating that the tissue sample is cancerous if the relaxation times are greater than the respective standards.

13. The apparatus according to claim 12, wherein the frequency adjusting means is adjusted so that the oscillator provides a magnetic field having a frequency which satisfies the nuclear magnetic resonance conditions of water protons.

14. The apparatus according to claim 12, wherein the frequency adjusting means is adjusted so that the oscillator provides a magnetic field having a frequency which satisfies the nuclear magnetic resonance conditions of phosphorus nuclei.

15. Apparatus for detecting cancerous cells in mammalian tissue comprising:
a. nuclear induction apparatus including a magnetic field source means for forming a magnetic field space and an oscillator source means for selectively supplying oscillating magnetic energy to the magnetic field space together with means for adjusting the frequency of the oscillator to satisfy nuclear magnetic resonance conditions for selected nuclei;
b. means for selecting a locus in the field space of equal field strength;
c. means adapted for holding the mammal in the magnetic field space;
d. means for focusing the oscillating magnetic energy into a beam;
e. means for directing the beam to impinge on said locus in a direction orthogonal to the direction of the magnetic field;
f. means for determining the spin-lattice relaxation time of the selected nuclei in tissue cells of the mammal when said mammal is located in the region of impingement;
g. means for determining the spin-spin relaxation time of the selected nuclei in tissue cells of the mammal when said mammal is located in the region of impingement;
h. means for storing reference tables comprising standard spin-lattice relaxation times and spin-spin relaxation times for the selected nuclei;
i. means for comparing the spin-lattice relaxation time and the spin-spin relaxation time of the selected nuclei in the region of impingement with their respective standards for normal tissue for the selected nuclei, and means for indicating that said mammal contains cancerous cells in the region of impingement if the relaxation times are greater than the respective standards.

16. Apparatus according to claim 13 further including means for scanning the beam across the locus.

* * * * *

PO-1050
(5/69)

UNITED STATES PATENT OFFICE
CERTIFICATE OF CORRECTION

Patent No. 3,789,832            Dated February 5, 1974

Inventor(s) Raymond V. Damadian

It is certified that error appears in the above-identified patent and that said Letters Patent are hereby corrected as shown below:

Column 1, line 12, correct the spelling of "cancerous".
Column 3, line 41, "25", second occurrence, should read --35--.
Column 5, line 1, that part of the formula reading
"$e^{-2n\tau}/T_2$" should read --$e^{-2n\tau/T_2}$--. Column 7, line 67, "Y" should read --y--. Column 9, line 51, before "values" insert --measured--; line 66, "transistors" should read --transitions--.
Column 10, line 7, before "cancerous" insert --for--.

Signed and sealed this 14th day of May 1974.

(SEAL)
Attest:

EDWARD M.FLETCHER,JR.          C. MARSHALL DANN
Attesting Officer                 Commissioner of Patents

UNITED STATES PATENT AND TRADEMARK OFFICE

CERTIFICATE EXTENDING PATENT TERM
UNDER 35 U.S.C. 156

Patent No.    : 3,789,832

Dated         : Feb. 5, 1974

Inventor(s)   : Damadian

Patent Owner  : Raymond V. Damadian

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

382 DAYS with all rights pertaining thereto as provided by 35 USC 156(b).

I have caused the seal of the Patent and Trademark Office to be affixed this Eighteenth day of April, 1986.

Donald J. Quigg

Assistant Secretary and Commissioner of Patents and Trademarks